US012579715B2

(12) United States Patent
Epstein et al.

(10) Patent No.: US 12,579,715 B2
(45) Date of Patent: Mar. 17, 2026

(54) DETECTION OF AI-GENERATED IMAGES

(71) Applicant: ADOBE INC., San Jose, CA (US)

(72) Inventors: David Charles Epstein, Orinda, CA (US); Richard Zhang, Burlingame, CA (US); Ishan Kapil Jain, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 168 days.

(21) Appl. No.: 18/479,234

(22) Filed: Oct. 2, 2023

(65) Prior Publication Data

US 2025/0111565 A1     Apr. 3, 2025

(51) Int. Cl.
 G06T 11/60          (2006.01)
 G06T 7/00          (2017.01)

(52) U.S. Cl.
 CPC ............ G06T 11/60 (2013.01); G06T 7/0002 (2013.01); G06T 2207/20081 (2013.01); G06T 2207/20084 (2013.01)

(58) Field of Classification Search
 CPC .................. G06T 11/60; G06T 7/0002; G06T 2207/20081; G06T 2207/20084
 See application file for complete search history.

(56) References Cited

U.S. PATENT DOCUMENTS

| | | | |
|---|---|---|---|
| 2020/0126209 A1 | 4/2020 | Kim et al. | |
| 2023/0401824 A1* | 12/2023 | Khan | G06V 10/7715 |
| 2025/0022256 A1* | 1/2025 | Welsh | G06T 5/50 |
| 2025/0078446 A1* | 3/2025 | Xu | G06V 10/771 |

OTHER PUBLICATIONS

D. C. Epstein, I. Jain, O. Wang and R. Zhang, "Online Detection of AI-Generated Images," 2023 IEEE/CVF International Conference on Computer Vision Workshops (ICCVW), Paris, France, Oct. 2-6, 2023, pp. 382-392, doi: 10.1109/ICCVW60793.2023.00045. (Year: 2023).*
Cozzolino, D., Thies, J., Rössler, A., Riess, C., Nießner, M., Verdoliva, L.: Forensic Transfer: weakly-supervised domain adaptation for forgery detection. arXiv preprint arXiv:1812.02510 (2018) (Year: 2018).*
R. Corvi, D. Cozzolino, G. Zingarini, G. Poggi, K. Nagano and L. Verdoliva, "On The Detection of Synthetic Images Generated by Diffusion Models," ICASSP 2023—2023 IEEE International Conference on Acoustics, Speech and Signal Processing (ICASSP), Rhodes Island, Greece, May 5, 2023, pp. 1-5, (Year: 2023).*

(Continued)

*Primary Examiner* — Yu Chen
(74) *Attorney, Agent, or Firm* — F. CHAU & ASSOCIATES, LLC

(57)          ABSTRACT
A method, apparatus, and non-transitory computer readable medium for obtaining an input image comprising a plurality of pixels. A machine learning model generates annotation information indicating whether each of the plurality of pixels is synthetically generated. A combined image is generated based on the annotation information. In some cases, the combined image shows a synthetically generated region of the input image.

16 Claims, 11 Drawing Sheets

(56)                    References Cited

OTHER PUBLICATIONS

Sangdoo Yun, Dongyoon Han, Seong Joon Oh, Sanghyuk Chun, Junsuk Choe, and Youngjoon Yoo. Cutmix: Regularization strategy to train strong classifiers with localizable features. In Proceedings of the IEEE/CVF international conference on computer vision, pp. 6023-6032, 2019. (Year: 2019).*

Chai, Lucy, et al. "What makes fake images detectable? understanding properties that generalize." European conference on computer vision. Cham: Springer International Publishing, 2020. (Year: 2020).*

Badrinarayanan, Vijay, Alex Kendall, and Roberto Cipolla. "Segnet: A deep convolutional encoder-decoder architecture for image segmentation." IEEE transactions on pattern analysis and machine intelligence 39.12 (2017): 2481-2495. (Year: 2017).*

Zeng, et al., "Toward Effective Image Manipulation Detection With Proposal Contrastive Learning", in IEEE Transactions on Circuits and Systems for Video Technology, vol. 33, No. 9, Sep. 2023, pp. 4703-4714.

Bunk, et al., "Detection and Localization of Image Forgeries using Resampling Features and Deep Learning", in IEEE Conference on Computer Vision and Pattern Recognition Workshops, 2017, DOI 10.1109/CVPRW.2017.235, pp. 1881-1889.

Biach, et al., "Encoder-decoder based convolutional neural networks for image forgery detection", 1169: Interdisciplinary Forensics: Government, Academia and Industry Interaction, https://doi.org/10.1007/s11042-020-10158-3, Nov. 10, 2020, 18 pages.

Combined Search and Examination Report dated Oct. 8, 2024 in corresponding Great Britain Patent Application No. GB2407561.6, 8 pages.

Office Action dated Jan. 7, 2025 in corresponding German Patent Application 10 2024 120 394.3, 2 pages, in German.

Wang, et al., "CNN-generated images are surprisingly easy to spot . . . for now", In Proceedings of the IEEE/CVF conference on computer vision and pattern recognition, 2020, pp. 8695-8704.

Yun, et al., "CutMix: Regularization Strategy to Train Strong Classifiers with Localizable features", In Proceedings of the IEEE/CVF international conference on computer vision, 2019, pp. 6023-6032.

He, et al., "Deep Residual Learning for Image Recognition", In Proceedings of the IEEE conference on computer vision and pattern recognition, 2016, pp. 770-778.

Long, et al., "Fully Convolutional Networks for Semantic Segmentation", In Proceedings of the IEEE conference on computer vision and pattern recognition, 2015, pp. 3431-3440.

Rombach, et al., "High-Resolution Image Synthesis with Latent Diffusion Models", In Proceedings of the IEEE/CVF conference on computer vision and pattern recognition, 2022, pp. 10684-10695.

Russakovsky, et al., "ImageNet Large Scale Visual Recognition Challenge", arXiv preprint arXiv:1409.0575v3 [cs.CV] Jan. 30, 2015, 43 pages.

Schuhmann, et al., "Laion-400m: Open dataset of CLIP-Filtered 400 Million Image-Text Pairs", arXiv preprint arXiv preprint arXiv:2111.02114 [cs.CV] Nov. 3, 2021, 5 pages.

* cited by examiner

Combined Image

120

115

Input Image

105

100

Figure 2:
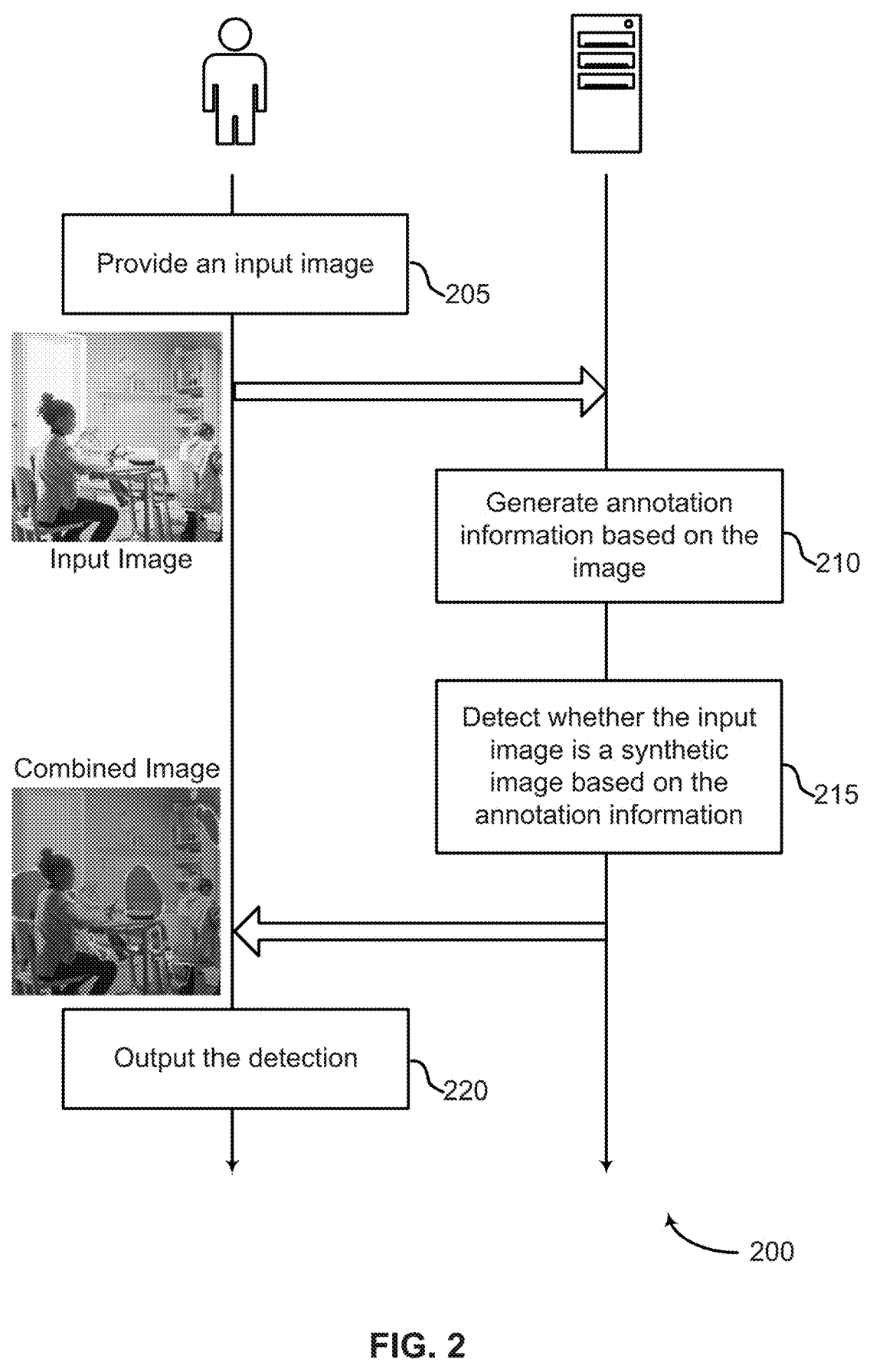

Provide an input image  ~205

Input Image

Generate annotation information based on the image  ~210

Detect whether the input image is a synthetic image based on the annotation information  ~215

Combined Image

Output the detection  ~220

Encode the input image to obtain an image embedding ⟍605

Decode the image embedding to obtain the annotation information ⟍610

Combine the input image with a mask representing the annotation information ⟍615

600

Obtain training data including a set of real images and a set of synthetic images generated at least in part by a set of different generative machine learning models

705

Train the machine learning model to detect whether an image is a synthetic image based on the training data

710

700

Identify an additional generative machine learning model after training the machine learning model

805

Obtain additional training data generated by the additional generative machine learning model

810

Update the machine learning model based on the additional training data

815

800

1005

1000

DETECTION OF AI-GENERATED IMAGES

BACKGROUND

The following relates generally to image processing, and more specifically to image detection. Image processing refers to the use of a computer to edit an image using an algorithm or a processing network. In some cases, image processing software can be used for various image processing tasks, such as image editing, image restoration, image generation, and image detection. Image detection includes the use of a machine learning model to identify and locate objects within an image. In some cases, a machine learning model is trained to classify regions of the image that contain artifacts or non-artifacts.

SUMMARY

Aspects of the present disclosure provide methods, non-transitory computer readable media, apparatuses, and systems for image detection. According to an aspect of the present disclosure, a machine learning model is trained to generate annotation information indicating whether a pixel of a set of pixels in an image is synthetically generated. In some examples, the machine learning model receives training data including a set of real images and a set of generated images corresponding to the set of real images. In some embodiments, the machine learning model combines a portion of a real image from the training data with a portion of a generated image to obtain a combined image. The machine learning model is further trained based on the combined image.

A method, apparatus, non-transitory computer readable medium, and system for image processing are described. One or more aspects of the method, apparatus, non-transitory computer readable medium, and system include obtaining an input image comprising a plurality of pixels; generating, using a machine learning model, annotation information indicating whether each of the plurality of pixels is synthetically generated; and generating a combined image based on the annotation information, wherein the combined image shows a synthetically generated region of the input image.

A method, apparatus, non-transitory computer readable medium, and system for image processing are described. One or more aspects of the method, apparatus, non-transitory computer readable medium, and system include obtaining training data including a plurality of real images and a plurality of synthetic images generated at least in part by a plurality of different generative machine learning models; and training the machine learning model to detect whether an image is a synthetic image based on the training data.

An apparatus, system, and method for image processing are described. One or more aspects of the apparatus, system, and method include at least one processor; at least one memory including instructions executable by the at least one processor; and a machine learning model comprising parameters stored in the at least one memory, wherein the machine learning model is trained to generate annotation information indicating whether each of a plurality of pixels of an input image is synthetically generated based on training data from a plurality of generative machine learning models.

BRIEF DESCRIPTION OF THE DRAWINGS

FIG. 2 shows an example of a method for detecting a synthetic image according to aspects of the present disclosure.

DETAILED DESCRIPTION

Figure 1:
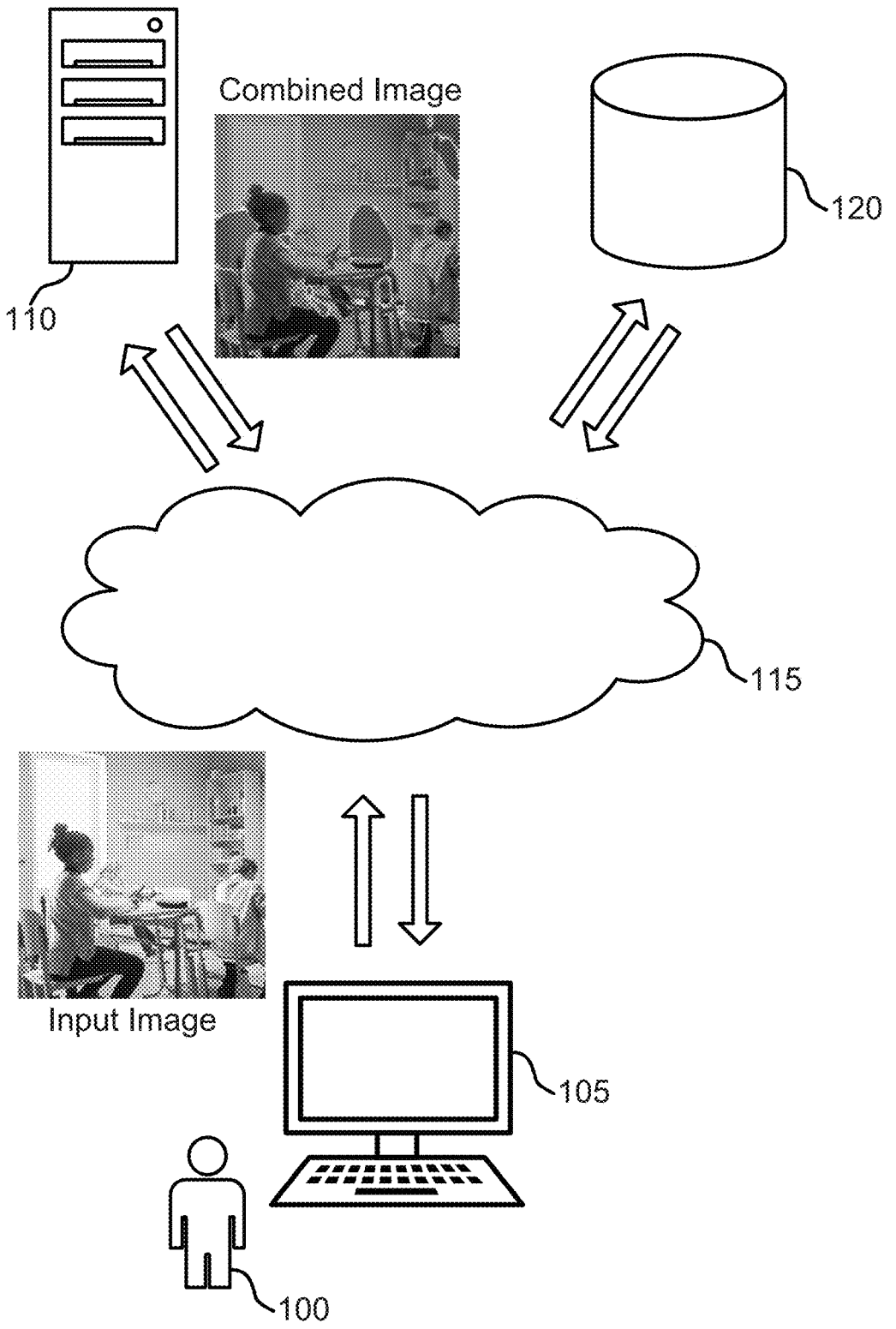
FIG. 1 shows an example of an image processing system according to aspects of the present disclosure.

Aspects of the present disclosure provide methods, non-transitory computer readable media, apparatuses, and systems for image detection. According to an aspect of the present disclosure, a machine learning model is trained to generate annotation information indicating whether a pixel of a set of pixels in an image is synthetically generated. In some examples, the machine learning model receives training data including a set of real images and a set of generated images corresponding to the set of real images. In some embodiments, the machine learning model combines a portion of a real image from the training data with a portion of a generated image to obtain a combined image. The machine learning model is further trained based on the combined image.

A subfield in image detection relates to detecting artifacts in an image to distinguish traditionally sourced images (or real images), such as traditionally sourced photos, document, and drawing, from AI-generated images (or synthetic images) using a machine learning model. Traditional machine learning model for detecting synthetic images is trained using datasets including real images and synthetic images generated from a single image generator. However, the traditional machine learning model for detecting synthetic images performs poorly when used to detect synthetic images generated from a different image generator when the output of the different image generator is not used as the traditional machine learning model's training data.

Accordingly, unlike conventional models, embodiments of the disclosure detect synthetic images generated by multiple different image generation models, including models trained after the machine learning model used to detect the synthetic images. Furthermore, some embodiments detect synthetic portions of an image that includes both real and synthetic parts (e.g., created with generative inpainting). For example, some embodiments generate per-pixel information indicating whether that pixel is synthetically generated.

By detecting synthetic images from multiple image generation models, and by detecting per-pixel synthetic image data, embodiments of the disclosure can enable applications such as determining whether images are real (e.g., for inclusion in news media), resolving intellectual property questions, and recognizing or incentivizing creators. Additionally, users can identify synthetic regions of an image and perform additional inpainting or modifications to those portions without impacting original portions of an image, even if the original image is not available for comparison. Furthermore, embodiments of the invention enable these applications even if the origin of an image is unknown (i.e., it is not known which, if any, image generation model was used to create or modify an image).

One or more aspects of the present disclosure include training a machine learning model using real images and synthetic images generated by different image generators. In some embodiments, the synthetic images and the corresponding real images are divided into batches and are ordered, where the order is based on information indicative of a temporal order of the different image generators, for example, the dates or release dates of the image generators. By training the machine learning model with datasets (including real images and synthetic images) in a chronological order, the machine learning model is able to detect synthetic images generated from an image generator without the corresponding real images in the machine learning model.

In some cases, a synthetic image is wholly computer-generated. In some cases, a synthetic image is inpainted, in which the synthetic image includes a region of computer-generated image and a region of real image. A traditional machine learning model is trained based on the synthetic image (e.g., inpainted image) and the corresponding real image and ground-truth mask. However, some traditional machine learning models are unable to identify an inpainted region of a synthetic image without having the corresponding training data.

Accordingly, aspects of the present disclosure include detecting synthetic images on a pixel level. In some embodiments, a machine learning model is trained to generate annotation information indicating whether a pixel of an inpainted image is synthetically generated. In some embodiments, the machine learning model combines a portion of a real image and a portion of a generated image from the training data to obtain a combined image. The machine learning model is further trained based on the combined image. By training the machine learning model with the combined image, the machine learning model is able to detect a synthetic region in a generated image without the corresponding real image and ground-truth mask that represents the synthetic region. In some embodiments, the machine learning model generates a heatmap representing the synthetic region in the generated image.

Embodiments of the present disclosure may be used in the context of image detection, image validation, and document authentication. For example, an image processing apparatus comprising the machine learning model based on the present disclosure detects synthetically generated images or a synthetically generated region in an image generated from an "unseen" generator without a corresponding training image. An "unseen" generator refers to a generative machine learning model which the output of the generative machine learning model is not used in the training dataset of the machine learning model. The image processing apparatus detects a synthetically generated region of the image on a pixel level.

An example application of the inventive concept in image detection is provided with reference to FIG. 2. Details regarding the architecture of an image processing apparatus are provided with reference to FIG. 5. An example of a process for image processing is provided with reference to FIG. 6. A description of an example training process is provided with reference to FIGS. 7-9.

As used herein, the term "synthetically generated," "synthetic image," or "synthetical image" refers to pixels or images that are created artificially or generated by using a computer rather than images captured or recorded from the real world using, for example, sensors and cameras. For example, a synthetically generated image contains artifacts that are detectable by a machine learning model. A real image does not contain artifacts that are detectable by a machine learning model.

Image Detection

An apparatus, system, and method for image processing are described. One or more aspects of the apparatus, system, and method include at least one processor; at least one memory including instructions executable by the at least one processor; and a machine learning model comprising parameters stored in the at least one memory, wherein the machine learning model is trained to generate annotation information indicating whether each of a plurality of pixels of an input image is synthetically generated based on training data from a plurality of generative machine learning models.

In FIGS. 1-4, a method, apparatus, non-transitory computer readable medium, and system for image processing are described. One or more aspects of the method, apparatus, non-transitory computer readable medium, and system include obtaining an input image comprising a plurality of pixels; generating, using a machine learning model, annotation information indicating whether each of the plurality of pixels is synthetically generated; and generating a combined image based on the annotation information, wherein the combined image shows a synthetically generated region of the input image.

Some examples of the method, apparatus, non-transitory computer readable medium, and system further include encoding the input image to obtain an image embedding. Some examples further include decoding the image embedding to obtain the annotation information.

In some aspects, the machine learning model is trained using training data including synthetical images generated by a plurality of generative machine learning models. In some aspects, the plurality of generative machine learning models comprises a plurality of diffusion models with different architectures.

In some aspects, the annotation information comprises a heatmap indicating a likelihood that each of the plurality of pixels is synthetically generated. Some examples of the method, apparatus, non-transitory computer readable medium, and system further include combining the input image with a mask representing the annotation information.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 5.

Referring to FIG. 1, according to some embodiments, user 100 provides an input image to image processing apparatus 110 via user device 105 and cloud 115. In some cases, image processing apparatus 110 generates a combined image based on the input image. The combined image includes a masked region on the input image indicating synthetically generated pixels. Image processing apparatus 110 displays the combined image on user device 105 to user 100, e.g., via cloud 115.

In some embodiments, image processing apparatus 110 generates annotation information indicating whether each pixel in the input image is synthetically generated. In some embodiments, synthetically generated pixels or a likelihood of synthetically generated pixels are represented in a heatmap, where the heatmap is combined with the input image as a combined image. In some embodiments, image processing apparatus 110 displays the combined image to user 100 via user device 105 and cloud.

User device 105 may be a personal computer, laptop computer, mainframe computer, palmtop computer, personal assistant, mobile device, or any other suitable processing apparatus. In some examples, user device 105 includes software that incorporates an image detection application. In some examples, the image detection application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the image processing apparatus 110 is further described with reference to FIG. 2.

Image processing apparatus 110 is an example of, or includes aspects of, the corresponding element described with reference to FIGS. 5 and 11. According to some aspects, image processing apparatus 110 includes a computer implemented network comprising a machine learning model, an encoder, a decoder, and a class sampler. Image processing apparatus 110 further includes a processor unit, a memory unit, an I/O module, and a training component. In some embodiments, image processing apparatus 110 further includes communication interface, user interface components, and a bus as described with reference to FIG. 11. Additionally, image processing apparatus 110 communicates with user device 105 and database 125 via cloud 115. Further detail regarding the operation of image processing apparatus 110 is provided with reference to FIGS. 2 and 4.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

FIG. 2 shows an example of a method 200 for detecting a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, according to some aspects, an image processing apparatus (such as the image processing apparatus described with reference to FIGS. 1 and 5) generates a combined image based on an input image by generating annotation information indicating whether each pixel in the input image is synthetically generated, and generating the combined image based on the annotation information. In some aspects, the combined image shows a synthetically generated region of the input image. For example, the synthetically generated region includes pixels that are indicated as synthetically generated. For example, the combined image includes one or more portions of the input image. In some examples, the one or more portions are disconnected.

In some embodiments, the image processing apparatus is trained by combining a portion of a real image and a portion of a synthetically generated image from the training data to obtain a combined training image. The image processing apparatus is further trained based on the combined training image to detect synthetically generated pixels. In some embodiments, the image processing apparatus is trained with training data (including real images and synthetic images) in chronological order (e.g., training the image processing apparatus with a first training dataset generated from a first image generator and update the first training dataset with a second dataset generated from a second image generator, where the second generator has a date later than the first image generator). By training the image processing apparatus in such an order, the image processing apparatus is able to detect synthetic images generated from an image generator without the corresponding training data (e.g., real images).

At operation 205, the system provides an input image. In some cases, the operations of this step refer to, or may be performed by, a user as described with reference to FIG. 1. For example, in some cases, the user provides an input image to an image processing apparatus (e.g., the image processing apparatus described with reference to FIG. 1) via a user interface provided by the image processing apparatus on a user device (e.g., the user device described with refence to FIG. 1). In some cases, the input image is an inpainted image including a synthetically generated region and a real region. In some cases, the input image is a synthetically generated image.

At operation 210, the system generates annotation information based on the image. In some cases, the operations of this step refer to, or may be performed by, an image processing apparatus as described with reference to FIGS. 1 and 5. For example, in some cases, the input image is encoded using an encoder to generate an image embedding. A decoder is used to decode the image embedding to obtain the annotation information.

At operation 215, the system detects whether the input image is a synthetic image based on the annotation information. In some cases, the operations of this step refer to, or may be performed by, an image processing apparatus as described with reference to FIGS. 1 and 5. For example, in some cases, the annotation information includes a likelihood of whether a pixel in the input image is synthetically generated.

At operation 220, the system outputs the detection. In some cases, the operations of this step refer to, or may be performed by, an image processing apparatus as described with reference to FIGS. 1 and 5. In some cases, the image processing apparatus outputs a combined image to the user via the user interface provided on the user device.

Figure 3:
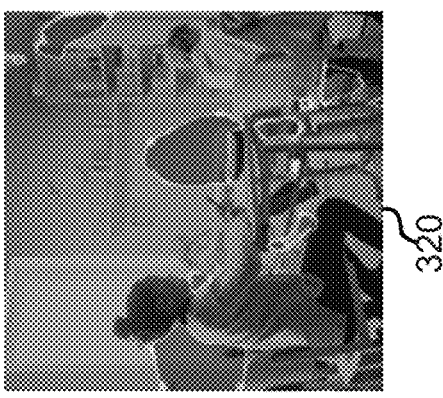
FIG. 3 shows an example of detecting synthetic regions of an inpainted image according to aspects of the present disclosure.
Figure 3:
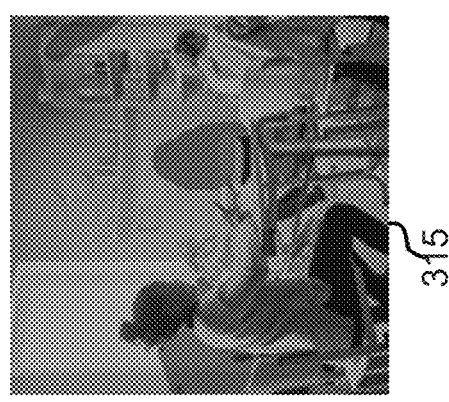
Figure 3:
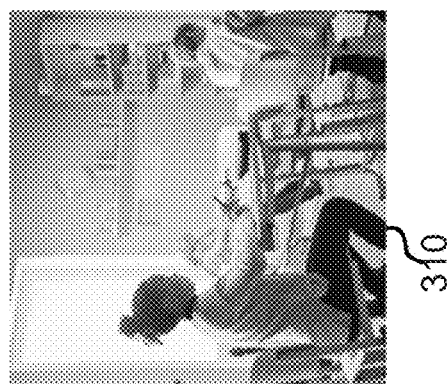
Figure 3:
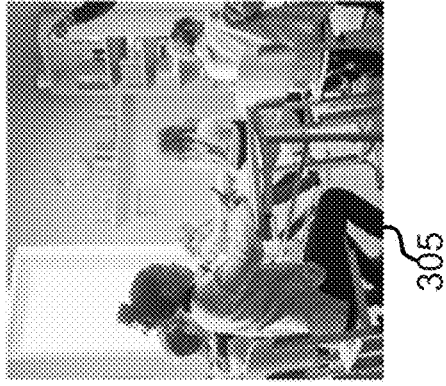

FIG. 3 shows an example of detecting synthetic regions of an inpainted image according to aspects of the present disclosure. The example shown includes ground-truth image 305, synthetic image 310, ground-truth mask 315, and combined image 320.

Referring to FIG. 3, a machine learning model (e.g., the machine learning model described with reference to FIG. 5) receives synthetic image 310 and generates combined image 320. Synthetic image 310 is generated by an "unseen" image generator (e.g., Adobe® Firefly's inpainting model) based on ground-truth image 305. For example, the machine learning model is not yet trained with datasets (including generated images/synthetic images, ground-truth masks, and ground-truth images) from Adobe® Firefly's inpainting model. In some cases, Adobe® Firefly's inpainting model generates ground-truth mask 315 depicting regions/pixels that are synthetically generated. Inpainting refers to a method of filling in missing or corrupted portions of an image using information derived from the surrounding pixels. In some examples, inpainting is used to produce a visually coherent completion that is consistent with the surrounding region. Combined image 320 generated by the machine learning model includes a plurality of masked regions depicting synthetically generated pixels. In some cases, the masked regions are represented by heatmaps. FIG. 3 demonstrates that combined image 320 generated by the machine learning model, according to aspects of the present disclosure, successfully captures the generated pixels in synthetic image 310 generated from Adobe® Firefly's inpainting model without corresponding training dataset in the machine learning model. For example, the masked regions (including synthetically generated pixels) in combined image 320 and masked regions in ground-truth mask 315 are substantially the same.

Figure 4:
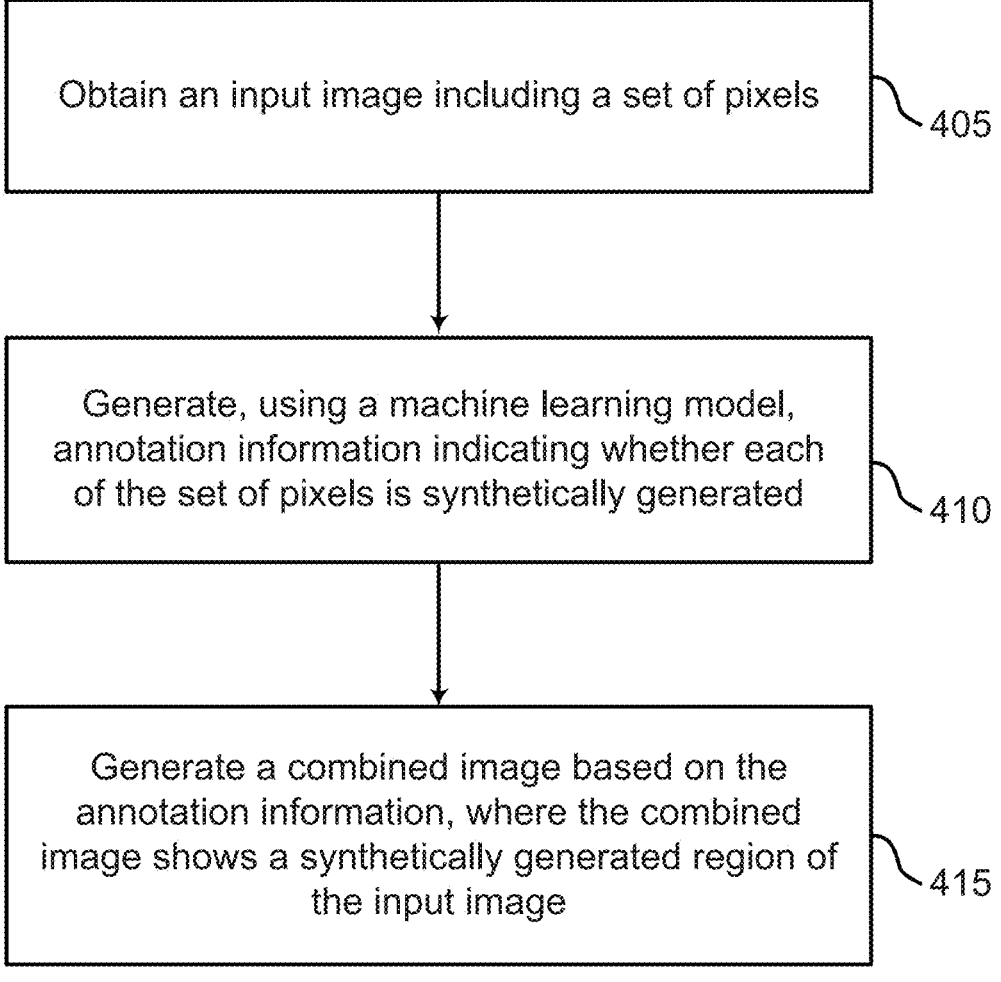
FIG. 4 shows an example of a method for detecting a synthetic region of an image in pixel level according to aspects of the present disclosure.

FIG. 4 shows an example of a method 400 for detecting a synthetic region of an image in pixel level according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains an input image including a set of pixels. In some cases, the operations of this step refer to, or may be performed by, a machine learning model as described with reference to FIGS. 5 and 9.

According to some embodiments of the present disclosure, the input image is an image generated from a generative machine learning model. For example, the machine learning model receives generated images from 14 different generative machine learning models, released between June 2020 and March 2023. These generative machine learning models are grouped into a first set for training the machine learning model and a second set for testing the machine learning model. The first set of generative machine learning models includes DDPM, DDIM, GLIDE, LDM, Dalle 2, Midj v2, RDM, SD v1, Midj v3, and SD v2. The second set of generative machine learning models include DiT, Midj v4, Midj v5, and Firefly. The input image may include an image generated from, for example, Firefly. In some cases, the input image includes one or more regions that are synthetically generated. For example, a region of the input image may include synthetically generated pixels and a remaining region of the input image may include authentic (or real) pixels.

At operation 410, the system generates, using a machine learning model, annotation information indicating whether each of the set of pixels is synthetically generated. In some cases, the operations of this step refer to, or may be performed by, a machine learning model as described with reference to FIGS. 5 and 9. In some embodiments, the machine learning model is trained to identify artifacts in each pixel and generate annotation information based on the artifacts. Each of the generative machine learning models generates synthetic images having detectable artifacts based on the model architecture. For example, generative machine learning models with pixel diffusion architectures are grouped, which include DDPM, DDIM, and GLIDE. Generative machine learning models with latent diffusion models (LDMs) are also grouped. Each of these groups of generative machine learning models may include detectable artifacts.

At operation 415, the system generates a combined image based on the annotation information, where the combined image shows a synthetically generated region of the input image. In some cases, the operations of this step refer to, or may be performed by, a machine learning model as described with reference to FIGS. 5 and 9. In some embodiments, the machine learning model generates a mask representing the region of synthetically generated pixels. In some cases, the mask includes a heatmap that indicates a likelihood that each of the plurality of pixels is synthetically generated. In some cases, the combined image is displayed to the user. Combined image is an example of, or includes aspects of, the corresponding element described with reference to FIG. 3.

Network Architecture

Figure 5:
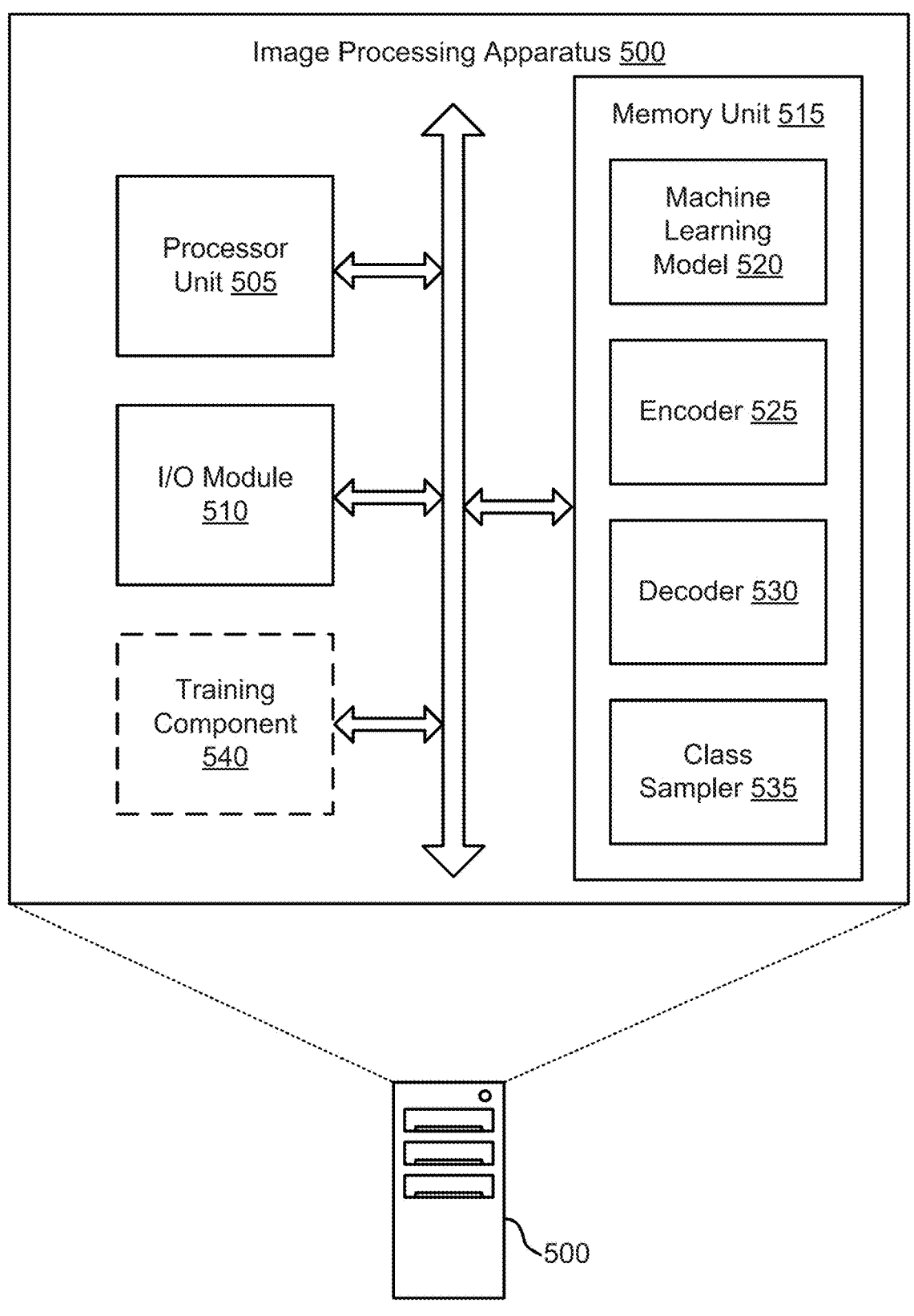
FIG. 5 shows an example of an image processing apparatus according to aspects of the present disclosure.

In FIG. 5, an apparatus, system, and method for image processing are described. One or more aspects of the apparatus, system, and method include at least one processor; at least one memory including instructions executable by the at least one processor; and a machine learning model comprising parameters stored in the at least one memory, wherein the machine learning model is trained to generate annotation information indicating whether each of a plurality of pixels of an input image is synthetically generated based on training data from a plurality of generative machine learning models.

Some examples of the apparatus, system, and method further include generating a combined image based on the annotation information, wherein the combined image shows a synthetically generated region of the input image. Some examples of the apparatus, system, and method further include an encoder configured to encode the input image to obtain an image embedding. Some examples further include a decoder configured to decode the image embedding to obtain the annotation information.

In some aspects, the encoder comprises a machine learning model comprises convolutional neural network (CNN). In some aspects, the decoder comprises a Fully Convolutional Network (FCN).

Some examples of the apparatus, system, and method further include a training component configured to train the machine learning model. In some aspects, the training data includes a partially synthetic training image comprising a real portion and a synthetic portion, and ground-truth annotation data indicating the real portion and the synthetic portion.

FIG. 5 shows an example of an image processing apparatus 500 according to aspects of the present disclosure. Image processing apparatus 500 is an example of, or includes aspects of, the corresponding element described with reference to FIG. 1. In one aspect, image processing apparatus 500 includes processor unit 505, I/O module 510, memory unit 515, and training component 540. In one aspect, memory unit 515 includes machine learning model 520, encoder 525, decoder 530, and class sampler 535.

Processor unit 505 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into the processor. In some cases, processor unit 505 is configured to execute computer-readable instructions stored in a memory to perform various functions. In some embodiments, processor unit 505 includes special-purpose components for modem processing, baseband processing, digital signal processing, or transmission processing. Processor unit 505 is an example of, or includes aspects of, the processor described with reference to FIG. 11.

I/O module 510 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 510 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

Examples of memory unit 515 include random access memory (RAM), read-only memory (ROM), or a hard disk. Examples of memory unit 515 include solid-state memory and a hard disk drive. In some examples, memory unit 515 is used to store computer-readable, computer-executable software including instructions that, when executed, cause a processor to perform various functions described herein. In some cases, memory unit 515 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 515 store information in the form of a logical state. Memory unit 515 is an example of, or includes aspects of, the memory subsystem described with reference to FIG. 11.

In some examples, memory unit 515 includes instructions executable by at least one processor unit 505. Memory unit 515 includes machine learning model 520 or stores parameters of machine learning model.

According to some aspects, machine learning model 520 obtains an input image including a set of pixels. In some examples, machine learning model 520 generates annotation information indicating whether each of the set of pixels is synthetically generated. In some examples, machine learning model 520 generates a combined image based on the annotation information, where the combined image shows a synthetically generated region of the input image.

In some aspects, the machine learning model 520 is trained using training data including synthetical images generated by a set of generative machine learning models. In some aspects, the set of generative machine learning models includes a set of diffusion models with different architectures. In some aspects, the annotation information includes a heatmap indicating a likelihood that each of the set of pixels is synthetically generated. In some examples, machine learning model 520 combines the input image with a mask representing the annotation information.

According to some aspects, machine learning model 520 obtains training data including a set of real images and a set of synthetic images generated at least in part by a set of different generative machine learning models. In some examples, machine learning model 520 divides the training data into a set of training batches based on which of the set of different generative machine learning models generated each of the set of synthetic images. In some examples, machine learning model 520 orders the set of different generative machine learning models according to a date corresponding to each of the set of different generative machine learning models, respectively, where the training data is divided based on the ordering.

In some examples, machine learning model 520 obtains a training real image and a training synthetic image. In some examples, machine learning model 520 combines at least a portion of the training real image with at least a portion of the training synthetic image to obtain a combined image, where the training data includes the combined image. In some aspects, the machine learning model 520 is trained to generate annotation information indicating whether each of a set of pixels is synthetically generated based on the combined image. In some aspects, the annotation information includes a heatmap with per pixel values corresponding to the set of pixels.

In some examples, machine learning model 520 identifies an additional generative machine learning model after training the machine learning model 520. In some examples, machine learning model 520 obtains additional training data generated by the additional generative machine learning model.

According to some aspects, machine learning model 520 comprises parameters stored in the at least one memory, wherein the machine learning model 520 is trained to generate annotation information indicating whether each of a plurality of pixels of an input image is synthetically generated based on training data from a plurality of generative machine learning models. In some examples, machine learning model 520 generates a combined image based on the annotation information, where the combined image shows a synthetically generated region of the input image.

According to some aspects, the training data includes a partially synthetic training image including a real portion and a synthetic portion, and ground-truth annotation data indicating the real portion and the synthetic portion. Machine learning model 520 is an example of, or includes aspects of, the corresponding element described with reference to FIG. 9.

According to some aspects, encoder 525 encodes the input image to obtain an image embedding. According to some aspects, encoder 525 is configured to encode the input image to obtain an image embedding. In some aspects, encoder 525 includes a machine learning model that includes convolutional neural network (CNN).

CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

According to some aspects, decoder 530 decodes the image embedding to obtain the annotation information. According to some aspects, decoder 530 is configured to decode the image embedding to obtain the annotation information. In some aspects, the decoder 530 includes a Fully Convolutional Network (FCN).

FCN is a class of deep neural network that is primarily used in computer vision or used for image processing tasks. FCN receives input image or an arbitrary size and outputs an image with the same spatial dimensions, where each pixel in the output image corresponds to a pixel in the input image and contains feature and/or class information. FCN includes convolutional layers to extract features from the input image. FCN includes skip connections to combine feature maps from different levels of the network. The final layer of the FCN includes a convolutional layer having a kernel size that matches a desired output resolution. The final layer produces a pixel-wise prediction where each pixel is associated with a class label or feature.

According to some aspects, class sampler 535 balances a distribution of the training data using a class sampler 535 based on a set of classes corresponding to the set of different generative machine learning models, respectively.

According to some aspects, training component 540 trains the machine learning model 520 to detect whether an image is a synthetic image based on the training data. In some examples, training component 540 updates the machine learning model 520 based on the additional training data. According to some aspects, training component 540 is configured to train the machine learning model 520.

According to some embodiments, training component 540 is implemented as software stored in memory unit 515 and executable by a processor in processor unit 505 of a separate computing device, as firmware in the separate computing device, as one or more hardware circuits of the separate computing device, or as a combination thereof. In some examples, training component 540 is part of another apparatus other than image processing apparatus 500 and communicates with the image processing apparatus 500. In some examples, training component 540 is part of image processing apparatus 500.

Image Detection

Figure 6:
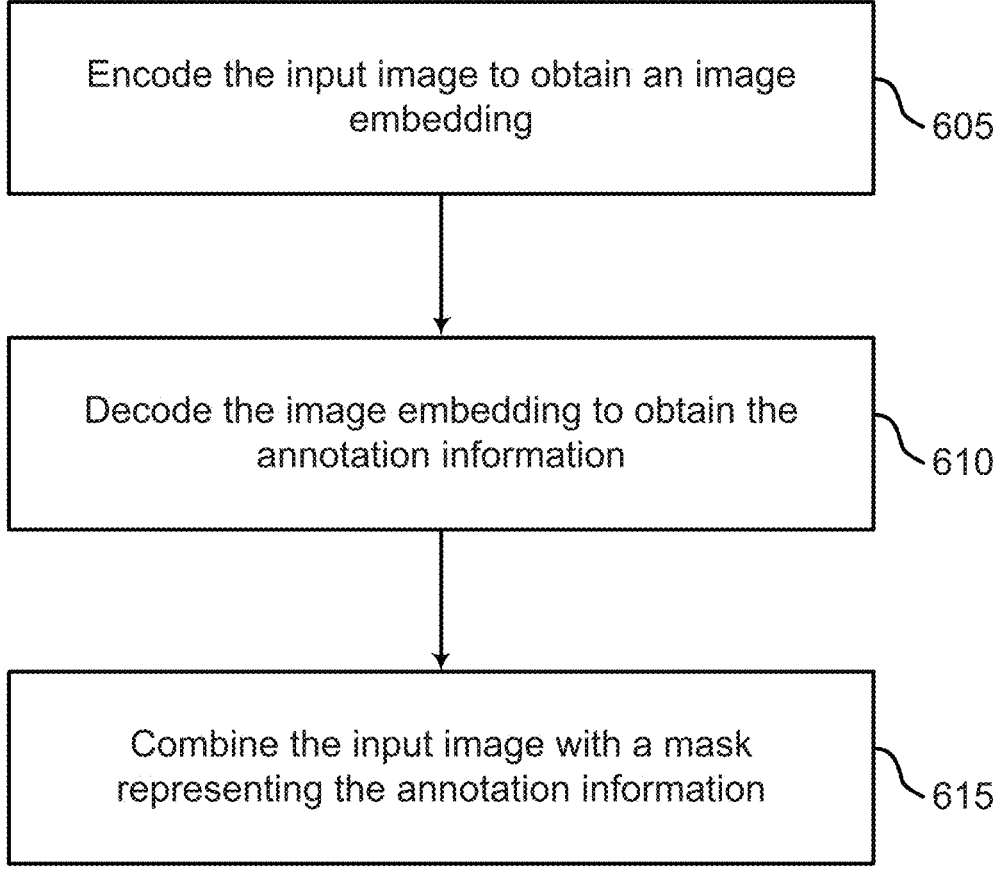
FIG. 6 shows an example of a method for detecting a synthetic region of an image according to aspects of the present disclosure.

FIG. 6 shows an example of a method 600 for detecting a synthetic region of an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system encodes the input image to obtain an image embedding. In some cases, the operations of this step refer to, or may be performed by, an encoder as described with reference to FIG. 5. For example, an image embedding is a numerical representation of an image in a high-dimensional vector space. The image embedding contains semantic information and features in a format that can be used by a machine learning model (described with reference to FIG. 5).

At operation 610, the system decodes the image embedding to obtain the annotation information. In some cases, the operations of this step refer to, or may be performed by, a decoder as described with reference to FIG. 5. In some cases, the decoder decodes the image embedding and generates an output image, where the output image includes annotation information. For example, the annotation information represents a likelihood of whether a pixel of a plurality of pixels in the input image is synthetically generated.

At operation 615, the system combines the input image with a mask representing the annotation information. In some cases, the operations of this step refer to, or may be performed by, a machine learning model as described with reference to FIGS. 5 and 9. In some cases, the mask includes a region of synthetically generated pixels in the input image. In some cases, the mask is represented by a heatmap.

Training and Evaluation

In FIGS. 7-10, a method, apparatus, non-transitory computer readable medium, and system for image processing are described. One or more aspects of the method, apparatus, non-transitory computer readable medium, and system include obtaining training data including a plurality of real images and a plurality of synthetic images generated at least in part by a plurality of different generative machine learning models; and training the machine learning model to detect whether an image is a synthetic image based on the training data.

Some examples of the method, apparatus, non-transitory computer readable medium, and system further include dividing the training data into a plurality of training batches based on which of the plurality of different generative machine learning models generated each of the plurality of synthetic images. Some examples of the method, apparatus, non-transitory computer readable medium, and system further include ordering the plurality of different generative machine learning models according to a date corresponding to each of the plurality of different generative machine learning models, respectively, wherein the training data is divided based on the ordering.

Some examples of the method, apparatus, non-transitory computer readable medium, and system further include obtaining a training real image and a training synthetic image. Some examples further include combining at least a portion of the training real image with at least a portion of the training synthetic image to obtain a combined image, where the training data includes the combined image. In some aspects, the machine learning model is trained to generate annotation information indicating whether each of a plurality of pixels is synthetically generated based on the combined image. In some aspects, the annotation information comprises a heatmap with per pixel values corresponding to the plurality of pixels.

Some examples of the method, apparatus, non-transitory computer readable medium, and system further include identifying an additional generative machine learning model after training the machine learning model. Some examples further include obtaining additional training data generated by the additional generative machine learning model. Some examples further include updating the machine learning model based on the additional training data. Some examples of the method, apparatus, non-transitory computer readable medium, and system further include balancing a distribution of the training data using a class sampler based on a plurality of classes corresponding to the plurality of different generative machine learning models, respectively.

Figure 7:
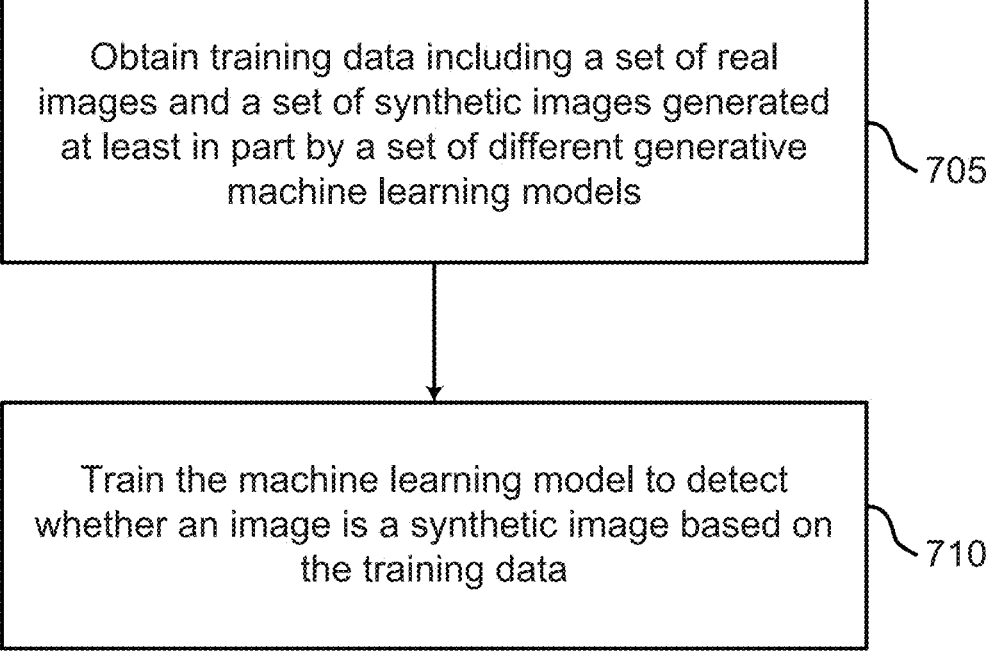
FIGS. 7 and 8 show examples of methods for training a machine learning model according to aspects of the present disclosure.

FIG. 7 shows an example of a method 700 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains training data including a set of real images and a set of synthetic images generated at least in part by a set of different generative machine learning models. In some cases, the operations of this step refer to, or may be performed by, a machine learning model as described with reference to FIGS. 5 and 9.

According to embodiments of the present disclosure, the machine learning model receives generated images from 14 different generative machine learning models, for example, released between June 2020 and March 2023. These different generative machine learning models reflect the rapid pace of advancement in realistic synthetic image generation. In some embodiments, the different generative machine learning models are grouped by the architecture of each of the generative machine learning models that generates the final pixels.

The training dataset is used to evaluate the generalization of detectors to unseen generative machine learning models. For example, generated images and the corresponding release dates of each of generative machine learning models are used to simulate an online learning setting. For publicly available models, the model release date from a repository is used. For products that do not have a model release date but can be queried with an API (e.g., Midjourney and Firefly), a date that the generative machine learning model is queried is used. In total, the dataset includes 570,221 images (which includes 405,862 training images, 48,057 ground-truth images, and 116,302 test images). Further details regarding training data are described with reference to FIG. 9.

At operation 710, the system trains the machine learning model to detect whether an image is a synthetic image based on the training data. In some cases, the operations of this step refer to, or may be performed by, a training component as described with reference to FIG. 5.

According to some embodiments of the present disclosure, the machine learning model progressively trains a binary classifier with a cross-entropy loss to distinguish between naturally sourced "real" images and images generated by AI (e.g., synthetic images). In some cases, a simple classifier can generalize across different generators (e.g., different generative machine learning models). According to some embodiments, the machine learning model includes a CNN architecture and a ResNet-50, and the machine learning model is pre-trained on ImageNet. In some embodiments, the machine learning model includes an encoder including convolutional neural network (CNN) and a decoder including a fully convolutional network (FCN).

In some embodiments, the machine learning model applies a weighted Dice loss to compensate the data imbalance. During training, when training data is not available, whole images can be leveraged for pixel-wise labels by applying CutMix augmentation. CutMix blending is a naive approach of cutting and pasting blocks of one image into another. When an inpainting dataset is available, the machine learning model detects synthetically-generated inpainted images with random masks. Further details on training the machine learning model are described with reference to FIG. 9.

According to some aspects of the present disclosure, the machine learning model is trained with SDv1. For example, when trained with a training data generated from SDv1 that includes wholly synthetic images, the machine learning model is able to detect inpainted images generated by SDv1 with an accuracy of about 77.6%. However, when the machine learning model is further trained and updated with a modified training data by applying CutMix augmentation, the performance improves in detecting inpainted images generated by SDv1 with an accuracy of about 83.6%.

In some cases, when the machine learning model is trained with a training data generated from SDv1 inpainting that includes inpainted images, the machine learning model is able to detect inpainted images generated by SDv1 with an accuracy of 99.0%. However, when the machine learning model is further trained and updated with a modified training data by applying CutMix augmentation, the performance improves in detecting inpainted images generated by SDv1 with an accuracy of about 99.2%.

Figure 8:
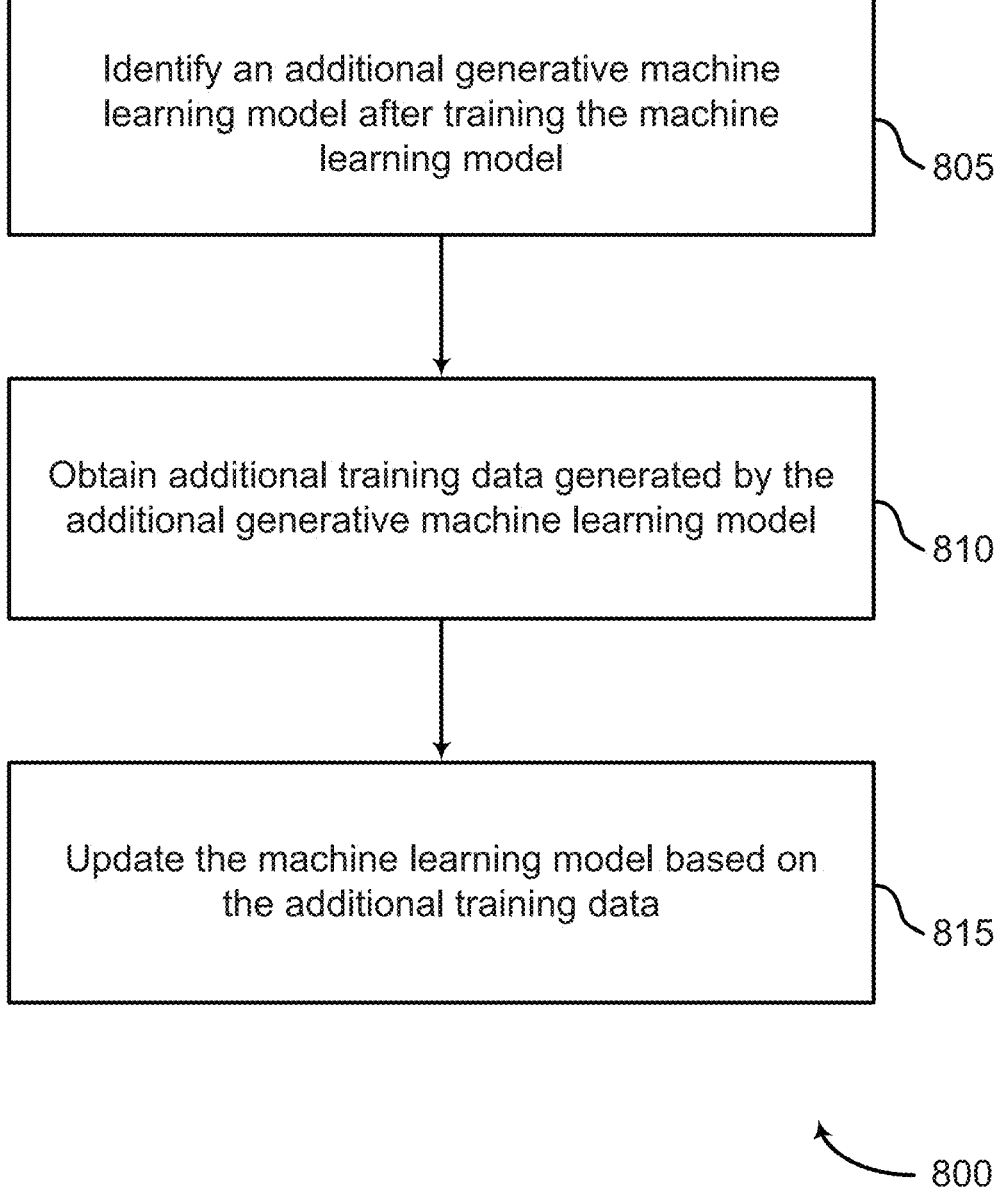

FIG. 8 shows an example of a method 800 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies an additional generative machine learning model after training the machine learning model. In some cases, the operations of this step refer to, or may be performed by, a machine learning model as described with reference to FIGS. 5 and 9. For example, the machine learning model is trained based on a training dataset including a first set of real images and a first set of synthetic images generated by a first generative machine learning model. The additional generative machine learning model is released at a later date than a release date of the first generative machine learning model. In some cases, the additional generative machine learning model has a same architecture as the first generative machine learning model. In some cases, the additional generative machine learning model has a different architecture. Further details on additional generative machine learning model are described with reference to FIGS. 9 and 10.

At operation 810, the system obtains additional training data generated by the additional generative machine learning model. In some cases, the operations of this step refer to, or may be performed by, a machine learning model as described with reference to FIGS. 5 and 9. For example, the additional training data includes a set of additional real images and a set of additional synthetic images generated at least in part by the additional generative machine learning model. In some cases, the additional synthetic images include wholly synthetic images. In some cases, the additional synthetic images include inpainted images, where a portion of the image is synthetically generated and a remaining portion is real image. Further details on additional generative machine learning model are described with reference to FIGS. 9 and 10.

At operation 815, the system updates the machine learning model based on the additional training data. In some cases, the operations of this step refer to, or may be performed by, a training component as described with reference to FIG. 5. For example, when updating the machine learning model based on the additional training data, the machine learning model is continuously trained from the previous model weights including the existing datasets. As a result, the training dataset expands and causing the machine learning model to detect synthetic images generated from a "unseen" generative machine learning model.

Figure 9:
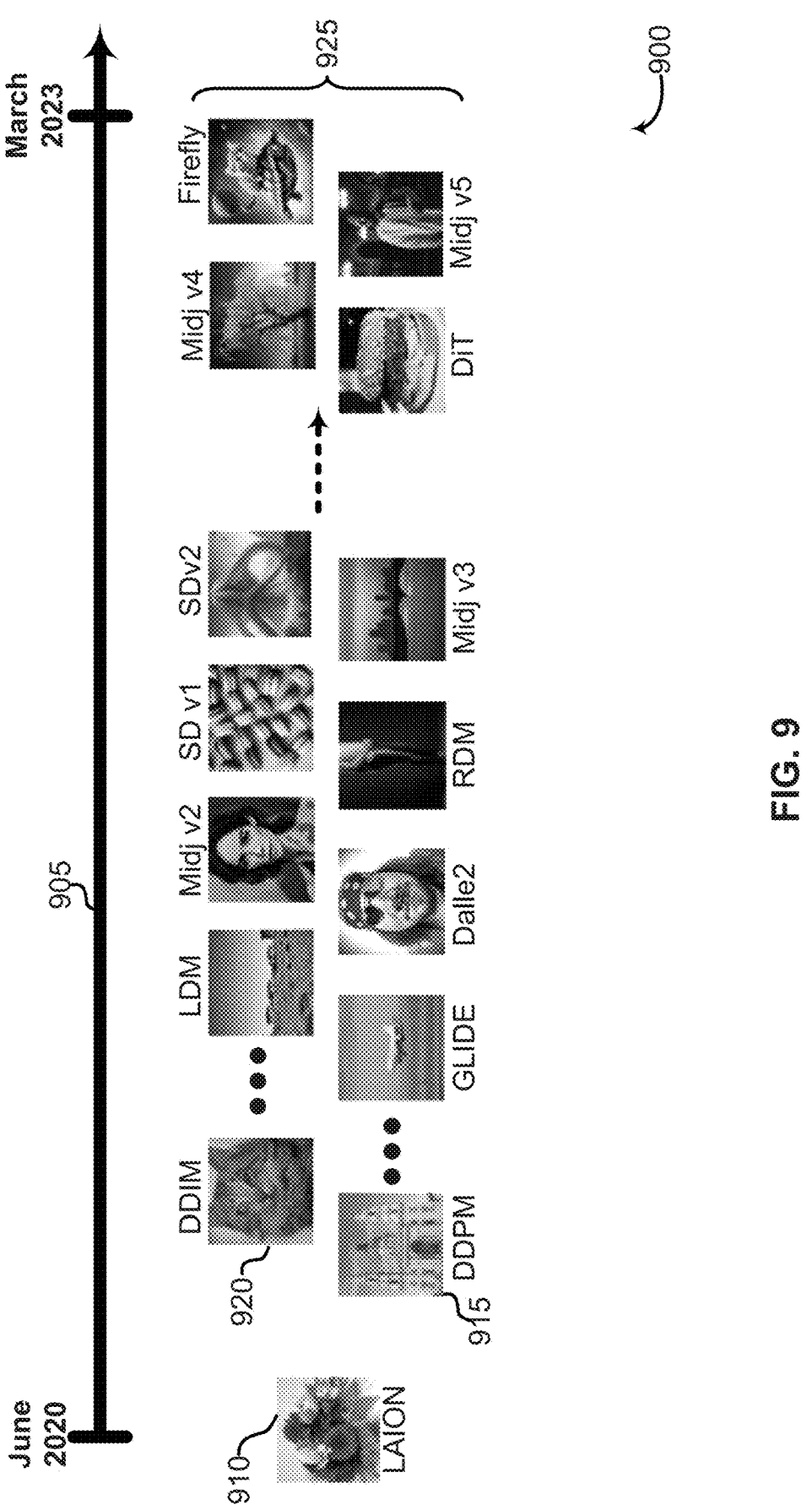
FIG. 9 shows an example of training a machine learning model according to aspects of the present disclosure.

FIG. 9 shows an example of training a machine learning model 900 according to aspects of the present disclosure. The example shown includes machine learning model 900, timeline 905, baseline dataset 910, first training dataset 915, second training dataset 920, and test set 925. Machine learning model 900 is an example of, or includes aspects of, the corresponding element described with reference to FIG. 5.

Referring to FIG. 9, machine learning model 900 is progressively trained with different datasets from different generative machine learning models. For example, the machine learning model 900 includes baseline dataset 910. In some cases, baseline dataset 910 includes non-generated images sourced from LAION-400M, in the beginning of training and remain throughout the training process. Machine learning model 900 further receives first training dataset 915 generated from a first generative machine learning model (e.g., DDPM). First training dataset 915 includes a set of first real images and a set of first synthetic images. In some cases, the set of first synthetic images includes synthetically generated pixels.

Machine learning model 900 further receives second training dataset 920 generated from a second generative machine learning model (e.g., DDIM). In some cases, the second generative machine learning model is referred as the additional generative machine learning model. The additional generative machine learning model has a release date later than the release date of the first generative machine learning model. For example, training data from each of the set of different generative models are provided to machine learning model 900 in a chronological order based on timeline 905. Similarly, second training dataset 920 includes a set of second real images and a set of second synthetic images.

According to some embodiments of the present disclosure, the second generative machine learning model includes an architecture different from the architecture in the first generative machine learning model. For example, the second generative machine learning model is a latent diffusion model (LDM). By ordering the training data based on the release date of each of the generative machine learning models, machine learning model 900 is able to simulate a real-world learning setting. Furthermore, machine learning model 900 is able to detect synthetic images generated from an untrained generative machine learning models without the corresponding training dataset based on the training.

In some embodiments, test set 925 includes generated images from generative machine learning models, e.g., DiT, Midj v4, Midj v5, and Firefly. Machine learning model 900 obtains the generated images in test set 925 as input images. Machine learning model 900 outputs a detection indicating whether the input images are synthetic images. In some cases, an input image in test set 925 includes inpainted images, where a region of the input image is synthetically generated and a remaining region of the input image is a real image. Machine learning model 900 is trained to detect synthetic pixels based on the progressive learning method described in accordance to the present disclosure. Machine learning model 900 detects and outputs a combined image including a mask region representing the synthetic pixels and the input image.

According to some embodiments, machine learning model 900 receives generated images from 14 different generative machine learning models, released between June 2020 and March 2023 (shown on timeline 905). These different generative machine learning models reflect the rapid pace of advancement in realistic synthetic image generation. In some embodiments, the different generative machine learning models are grouped by the architecture of each of the generative machine learning models that generates the final pixels.

According to embodiments of the present disclosure, the 14 generative machine learning models are grouped based on the architectures. For example, generative machine learning models with pixel diffusion architectures are grouped first, which includes DDPM, DDIM, and GLIDE. These generative machine learning models have a U-Net and a diffusion-based objective architecture. For example, DDPM and DDIM train unconditional models on smaller datasets, while GLIDE generates synthetic images based on text-to-image generation.

Additionally, DALL•E 2, a high-profile model from OpenAI is also grouped. At the time of data collection, DALL•E 2 was available through web interface, and did not include large-scale publicly available dataset. Instead, corresponding dataset is obtained through DALL•E 2 Reddit by retaining images of 1024×1024 (to filter out extraneous content, such as memes). In some cases, the web interface generates a watermark that would be easily identifiable by a classifier, and the bottom 16 pixels of the image is cropped out.

Second, the next largest family of generative machine learning models is latent diffusion models (LDMs). These generative machine learning models use a U-Net to perform diffusion in a latent domain, and then decode the latent signal with a decoder, trained as part of a variational autoencoder, in combination with a GAN and LPIPS perceptual loss. These generative machine learning models include Stable Diffusion and Stable Diffusion 2, a scaled-up version of Latent Diffusion trained on large-scale web data, containing multiple subversions. Additionally, some generative machine learning models changed the diffusion U-Nets with transformers based on ViT, which improves the discriminative tasks.

According to aspects of the present disclosure, generative machine learning models without publication are used as test sets. For example, images from Midjourney and Adobe Firefly are tested on the machine learning model according to aspects of the present disclosure. In some cases, images generated by Midjourney are obtained by scraping the Discord API. Since these generative machine learning models do not include publication data, the models are ordered based on the scraping date. In some cases, Adobe Firefly test images are obtained through the web interface without the watermarking.

Additionally, for generative machine learning models including GLIDE, LDM, RDM, Firefly (all datasets), and Stable Diffusion (including train dataset and ground-truth dataset), prompts from DiffusionDB are used as inputs to generate the set of synthetic images. The prompts may include, text prompt, color prompt, and image prompt. For the Stable Diffusion dataset, prompts from various web sources are used. Unique prompts are sampled so that the training dataset, ground-truth dataset, and test datasets are not overlapped.

In some cases, a synthetic image includes a composite of AI-generated pixels and traditionally sourced images. In some cases, the synthetic image is generated by "inpainting", where a masked region of an image is seamlessly filled with generated content. In an aspect, the machine learning model receives a dataset from Adobe® Firefly and Stable Diffusion's inpainting models. In some cases, ground truth masks may be difficult to acquire in real-world settings (e.g., with closed models) Accordingly, the machine learning model applies Cut-Mix to whole images to obtain pixel-wise labels. The machine learning model is also trained by using synthetic images (e.g., inpainted images) generated from other generative machine learning models (e.g., SDv1 inpainting model, SDv2 inpainting model, and Firefly).

In one aspect, the machine learning model receives three inpainting datasets, including Stable Diffusion (SDv1 and SDv2) and Adobe® Firefly. In some embodiments, the training dataset includes model release dates, input source (e.g., LAION), masked pixel distribution, and dataset size. For example, the machine learning model samples input images and corresponding prompts from the LAION-400M Dataset. In some cases, the machine learning model resizes the images to 512 pixels on the short side, applies center crop, and generates masks corresponding to the images. The machine learning model generates masks covering 15 to 35% of each image with random overlapping strokes and shapes, with a portion of shapes based on image content, or with dilation and jitter augmentations.

In some cases, whole image datasets including modified images are generated by using LAION inputs and an equal size sample of some of the generative machine learning models. The machine learning model preserves the quality of the non-masked region and isolates the generated pixels from the original by copying the original image back into the non-masked region. Accordingly, the modified images do not contain visible seam.

Figure 10:
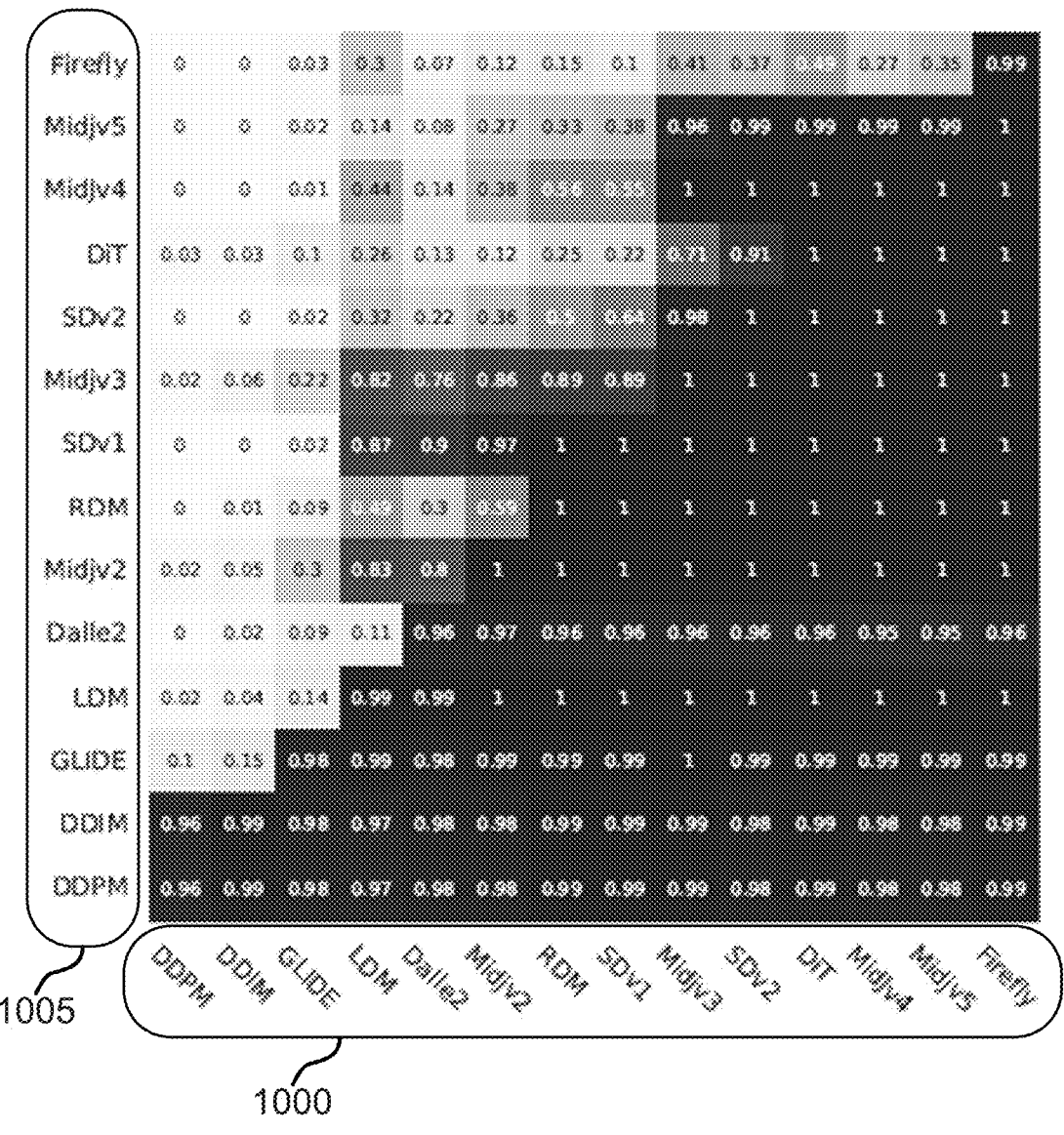
FIG. 10 shows an example of detection of synthetically generated images based on a trained machine learning model according to aspects of the present disclosure.

FIG. 10 shows an example of detection of synthetically generated images based on a trained machine learning model according to aspects of the present disclosure. The example shown includes generative models 1000 and test sets 1005.

Referring to FIG. 10, the machine learning model is progressively trained by each of the generative models 1000. For example, the machine learning model is first trained with training data generated from a first generative model (e.g., DDPM). In one aspect, test set 1005 includes synthetic images generated from generative models 1000. The trained machine learning model detects synthetic images from test set 1005. For example, when the machine learning model is trained with DDPM, the machine learning model is able to detect synthetic images generated from DDPM and DDIM with an accuracy about 0.96. However, the machine learning model cannot detect other synthetic images generated by different generative models with a high accuracy.

The machine learning model is updated based on a second generative model among generative models 1000. For example, when the machine learning model is trained with training data generated from a second generative model (e.g., LDM), the updated machine learning model is able to increase the accuracy in detecting synthetic images. For example, the updated machine learning model can detect synthetic images generated from Midjv2 with an accuracy of 0.83, whereas before the update, the machine learning mode can detect synthetic images generated from Midjv2 with an accuracy of 0.02-0.3. For example, the updated machine learning model can detect synthetic images generated from Firefly with an accuracy of 0.3, whereas before the update, the machine learning mode cannot detect synthetic images (e.g., accuracy is 0) generated from Firefly.

As demonstrated in FIG. 10, as the machine learning model is progressively trained by updating the training dataset, accuracy is increased on detecting synthetic images generated from generative models that are not yet trained. Machine learning model is an example of, or includes aspects of, the same element described with reference to FIGS. 5 and 9.

FIG. 10 further represents results in detecting synthetic images in an online setting. Generative models 1000 represents the machine learning model's training progress through time. Every column represents a step in the learning progression, with a classifier trained on all models up to that cell. Generative models are ordered by release date. For example, the "LDM" column includes training data generated from DDPM, DDIM, GLIDE, and LDM. The training data includes a set of real images (or ground-truth images) and a set of synthetic images. Test sets 1005 represent a set of generative machine learning models having release dates ordered from bottom to top (e.g., generative model located on the bottom is released the earliest and generative model located on the top is released the latest). Accordingly, cells in the upper left triangle show a generalization performance of the machine learning model on a plurality of generative machine learning models that are not yet included in the training.

In one aspect, after initially training the machine learning model and updating the initially trained machine learning model with additional datasets, performance on trained generative models (e.g., show on bottom-right of FIG. 10) remains about the same accuracy level. As shown in FIG. 10, the final column represents the machine learning model is trained on all generative models 1000, where the trained machine learning model produces a near-perfect performance across test set 1005. For example, a single detector can learn the different artifacts from different generative machine learning models.

Figure 11:
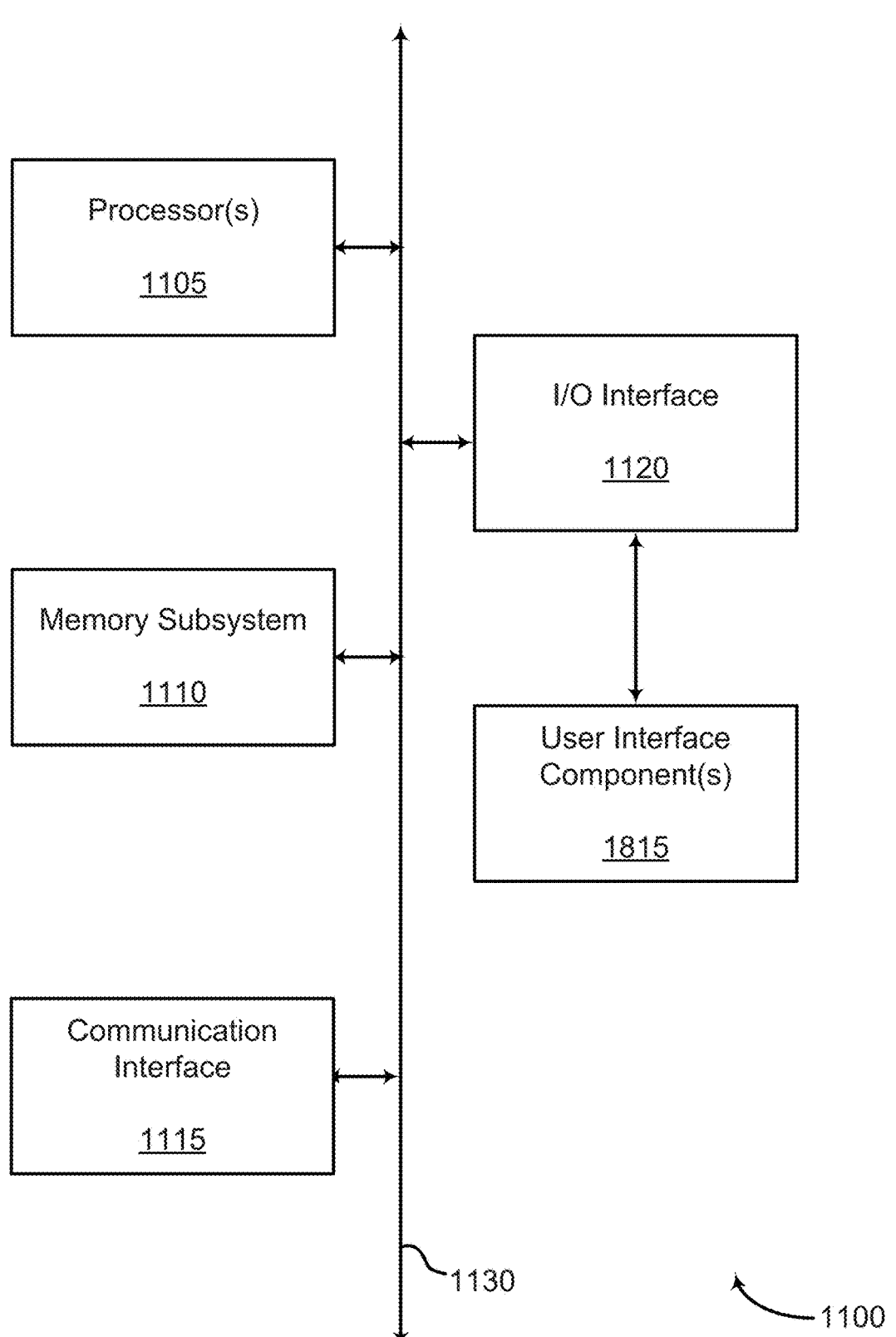
FIG. 11 shows an example of a computing device for a machine learning model according to aspects of the present disclosure.

FIG. 11 shows an example of a computing device 1100 for a machine learning model according to aspects of the present disclosure. The example shown includes computing device 1100, processor(s), memory subsystem 1110, communication interface 1115, I/O interface 1120, user interface component(s), and channel 1130. Machine learning model is an example of, or includes aspects of, the corresponding element described with reference to FIG. 5.

In some embodiments, computing device 1100 is an example of, or includes aspects of, the image processing apparatus of FIGS. 1 and 5. In some embodiments, computing device 1100 includes one or more processors 1105 that can execute instructions stored in memory subsystem 1110 to obtain an input image comprising a plurality of pixels; generate, using a machine learning model, annotation information indicating whether each of the plurality of pixels is synthetically generated; and generating a combined image based on the annotation information, wherein the combined image shows a synthetically generated region of the input image.

According to some embodiments, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing. Processor(s) 1105 is an example of, or includes aspects of, the processor unit described with reference to FIG. 5.

According to some embodiments, memory subsystem 1110 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1110 is an example of, or includes aspects of, the memory unit described with reference to FIG. 5.

According to some embodiments, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or via hardware components controlled by the I/O controller.

According to some embodiments, user interface component(s) 1125 enable a user to interact with computing device 1100. In some cases, user interface component(s) 1125 include an audio device, such as an external speaker system, an external display device such as a display screen, an input device (e.g., a remote-control device interfaced with a user interface directly or through the I/O controller), or a combination thereof.

Performance of apparatus, systems and methods of the present disclosure have been evaluated, and results indicate embodiments of the present disclosure have obtained increased performance over existing technology (e.g., image detectors). Example experiments demonstrate that the machine learning model based on the present disclosure outperforms conventional image detectors.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, micro-controller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
obtaining an input image comprising a plurality of pixels;
generating, using a machine learning model, annotation information by encoding the input image to obtain an image embedding and decoding the image embedding to obtain a plurality of values indicating whether each of the plurality of pixels is synthetically generated, respectively; and
generating a combined image based on the annotation information, wherein the combined image shows a synthetically generated region of the input image.

2. The method of claim 1, wherein:
the machine learning model is trained using training data including synthetical images generated by a plurality of generative machine learning models.

3. The method of claim 2, wherein:
the plurality of generative machine learning models comprises a plurality of diffusion models with different architectures.

4. The method of claim 1, wherein:
the annotation information comprises a heatmap indicating a likelihood that each of the plurality of pixels is synthetically generated.

5. The method of claim 1, further comprising:
combining the input image with a mask representing the annotation information.

6. An apparatus, comprising:
at least one processor;
at least one memory including instructions executable by the at least one processor; and
a machine learning model comprising parameters stored in the at least one memory, wherein the machine learning model is trained to generate annotation information by encoding an input image to obtain an image embedding and decoding the image embedding to obtain a plurality of values indicating whether each of a plurality of pixels of an input image is synthetically, respectively, generated based on training data from a plurality of generative machine learning models.

7. The apparatus of claim 6, wherein the instructions are further executable to:
generate a combined image based on the annotation information, wherein the combined image shows a synthetically generated region of the input image.

8. The apparatus of claim 6, wherein the machine learning model further comprises:
an encoder configured to encode the input image to obtain the image embedding; and
a decoder configured to decode the image embedding to obtain the annotation information.

9. The apparatus of claim 8, wherein:
the encoder comprises a machine learning model comprises convolutional neural network (CNN); and
the decoder comprises a Fully Convolutional Network (FCN).

10. The apparatus of claim 6, further comprising:
a training component configured to train the machine learning model.

11. The apparatus of claim 6, wherein:
the training data includes a partially synthetic training image comprising a real portion and a synthetic portion, and ground-truth annotation data indicating the real portion and the synthetic portion.

12. A non-transitory computer readable medium storing code for image processing, the code comprising instructions that, when executed by at least one processor, cause the at least one processor to perform operations comprising:

obtaining an input image comprising a plurality of pixels;

generating, using a machine learning model, annotation information by encoding the input image to obtain an image embedding and decoding the image embedding to obtain a plurality of values indicating whether each of the plurality of pixels is synthetically generated, respectively; and generating a combined image based on the annotation information, wherein the combined image shows a synthetically generated region of the input image.

13. The non-transitory computer readable medium of claim 12, wherein:

the machine learning model is trained using training data including synthetical images generated by a plurality of generative machine learning models.

14. The non-transitory computer readable medium of claim 13, wherein:

the plurality of generative machine learning models comprises a plurality of diffusion models with different architectures.

15. The non-transitory computer readable medium of claim 12, wherein:

the annotation information comprises a heatmap indicating a likelihood that each of the plurality of pixels is synthetically generated.

16. The non-transitory computer readable medium of claim 12, the code further comprising instructions that, when executed by at least one processor, cause the at least one processor to perform operations comprising:

combining the input image with a mask representing the annotation information.

\* \* \* \* \*